(12) United States Patent
Nishikitani et al.

(10) Patent No.: US 6,814,451 B2
(45) Date of Patent: Nov. 9, 2004

(54) ANTIGLARE MIRROR APPARATUS IN A VEHICLE COMPARTMENT

(75) Inventors: Yoshinori Nishikitani, Kanagawa (JP); Masaaki Kobayashi, Kanagawa (JP); Keizo Ikai, Kanagawa (JP); Tsuyoshi Asano, Nishikitani (JP)

(73) Assignee: Nippn Oil Corporation, Tokyo (JP)

( * ) Notice: Subject to any disclaimer, the term of this patent is extended or adjusted under 35 U.S.C. 154(b) by 0 days.

(21) Appl. No.: 10/634,016

(22) Filed: Aug. 4, 2003

(65) Prior Publication Data

US 2004/0027673 A1 Feb. 12, 2004

Related U.S. Application Data

(63) Continuation of application No. PCT/JP02/00934, filed on Feb. 5, 2002.

(30) Foreign Application Priority Data

Feb. 6, 2001 (JP) .................................. 2001-030097

(51) Int. Cl.⁷ .............................. G02B 5/08; G02B 27/00
(52) U.S. Cl. .................... 359/604; 359/603; 359/601
(58) Field of Search ........................ 359/601–608, 359/838, 871–877, 265–274

(56) References Cited

U.S. PATENT DOCUMENTS

| 4,917,477 A | | 4/1990 | Bechtel et al. ............... 359/603 |
| 5,204,991 A | * | 4/1993 | Law ........................... 307/10.7 |
| 5,691,849 A | * | 11/1997 | Ledroit et al. ............... 359/603 |
| 5,724,187 A | * | 3/1998 | Varaprasad et al. .......... 359/608 |
| 5,768,020 A | * | 6/1998 | Nagao ......................... 359/604 |
| 6,102,546 A | * | 8/2000 | Carter ......................... 359/604 |

FOREIGN PATENT DOCUMENTS

| JP | 53-42903 | 10/1978 |
| JP | 57-63302 | 4/1982 |
| JP | 58-184352 | 12/1983 |
| JP | 59-42740 | 3/1984 |
| JP | 59-42741 | 3/1984 |
| JP | 02-195327 | 8/1990 |
| JP | 05-286393 | 1/1993 |
| JP | 06-289434 | 10/1994 |
| JP | 3021443 | 11/1995 |
| JP | 08-106110 | 4/1996 |
| JP | 09-024768 | 1/1997 |
| JP | 2000-211428 | 8/2000 |

* cited by examiner

*Primary Examiner*—Thong Q Nguyen
(74) *Attorney, Agent, or Firm*—Lawrence E. Laubscher, Jr (57) ABSTRACT

In an antiglare mirror apparatus mounted inside a vehicle compartment a mirror member is an electrochromic element comprising an antiglare material including an electrochromic layer, a light transmission electrode material and a light reflective electrode material where the light transmission electrode material and the light reflective electrode material are positioned on both sides of the antiglare material and a control circuit controls a drive-electric energy to the electrochromic element based upon a driving electric signal of a signal generator wherein the mirror member is detachably mounted to a facility in a vehicle compartment so that a holder holds the mirror member and the mirror member covers a pre-mounted inner mirror.

13 Claims, 8 Drawing Sheets

(CROSS SECTION ON A – A)

ANTIGLARE MIRROR APPARATUS IN A VEHICLE COMPARTMENT

This application is a continuation of PCT/JP02/00934, filed on Feb. 5, 2002.

BACKGROUND OF THE INVENTION

1. Field of the Invention

The present invention relates to a post-mounted interior mirror for a motor vehicle and in particular, to an antiglare mirror apparatus mounted in a vehicle compartment with high antiglare performance using a mirror member made of an electrochromic element.

2. Related Art of the Invention

An interior mirror for a motor vehicle equipped for viewing a vehicle behind the vehicle is filled with glare when a headlight from the following vehicle is reflected in the interior mirror during driving at night and therefore, various kinds of antiglare mirrors have been proposed (Japanese Issued Patent Publication No. 2722590, Japanese Unexamined Patent Publication No. 8-106110, Japanese Issued Patent Publication No. 2858006).

These inner mirrors utilize an electrochromic element colored by oxidation-reduction reaction due to voltage impression where a mirror member is an electrochromic element made by laminating in order a light transmission electrode material, an antiglare material having an electrochromic layer, and a light reflective electrode material from the surface side.

Also there is another proposal that a coloring amount (namely, level of antiglare) of the mirror member is controlled manually or automatically by controlling electric energy for driving an electrochromic element. It is known that as a method of automatically controlling the coloring amount, an energy supply amount to the electrochromic element is controlled based upon information of surrounding light and incident light from the rear detected by a sensor, thereby to control the color amount (Japanese Unexamined Patent Publication No. 9-24768). Where the electrochromic element is driven in the coloring direction, the glare is restrained due to reduction in reflectance of the mirror member.

In Japanese Unexamined Patent Publication No. 5-286398, an antiglare apparatus that can be mounted to an inner mirror mounted beforehand is proposed where this apparatus has a transmission base made by laminating a transmission electrode material on both surfaces of an electrochromic layer and the transmission base is mounted to the surface of the inner mirror mounted beforehand. Accordingly, the electrochromic element is colored by voltage impression and the reflectance of the inner mirror is lowered.

On the other hand, it is known that when a visibility region to the rear is expected to be enlarged, a replacement mirror is mounted to a pre-mounted mirror (Japanese Issued Utility Publication No. 3021443, Japanese Unexamined Utility Publication No. 59-42740, No. 59-42741, No.58-184352, No.57-63302). The replacement mirror of these Publications is mounted to the pre-mounted mirror so as to cover the mirror member on the surface thereof and a mounting member for holding the pre-mounted mirror in both an upper edge portion and a lower edge portion thereof is mounted to a rear side of a holder.

However, an antiglare mirror disclosed in Japanese Unexamined Patent Publication No.9-24768 is mounted in a factory when a new car is manufactured and therefore, it is not so easy for ordinary people to replace a pre-mounted mirror with the antiglare mirror because a large alteration in a vehicle interior is required.

In an antiglare apparatus disclosed in Japanese Unexamined Patent Publication No. 5-286393, a transparent base is used and therefore, it does not function as a mirror. Also, since a mirror is mounted on a mirror member of a pre-mounted mirror and light is reflected using the mirror member thereof, the visibility region thereof can not be enlarged more than the pre-mounted mirror. Further, if an opaque object is inserted between the transparent base of the antiglare apparatus and the mirror member of the pre-mounted mirror, it will not work. Accordingly, in this apparatus a control circuit for driving the electrochromic element, a switch, a sensor and the like can not be arranged inside the holder.

SUMMARY OF THE INVENTION

Therefore, an antiglare mirror apparatus mounted in a vehicle compartment according to the present invention includes a mirror member having an electrochromic element that disposes an antiglare material including an electrochromic layer, a light transmission electrode material and a light reflective electrode material on both sides of the antiglare material, a power source member that supplies electric energy to drive the electrochromic element, a signal generator that generates a driving electric signal of the electrochromic element, a control circuit that controls the drive-electric energy of the electrochromic element based upon the driving electric signal, and a holder that holds the mirror member and is detachably mounted to a facility in a vehicle compartment.

According to the above arrangement, the energy from the power source member is supplied to the antiglare material through the light transmission electrode material and the light reflective electrode material so that the antiglare material is colored. When light transmits the antiglare material, the spectrum thereof with a predetermined wave length is absorbed therein and the resultant light is reflected in the light reflective electrode material. Therefore, reflectance of the mirror member is lowered and antiglare performance increases. This mirror member holder is removably connected to the facility in a vehicle compartment, and thereby an alteration is not needed for mounting the mirror member to the vehicle compartment.

DETAILED EXPLANATION OF THE PREFERRED EMBODIMENTS

Figure 1:
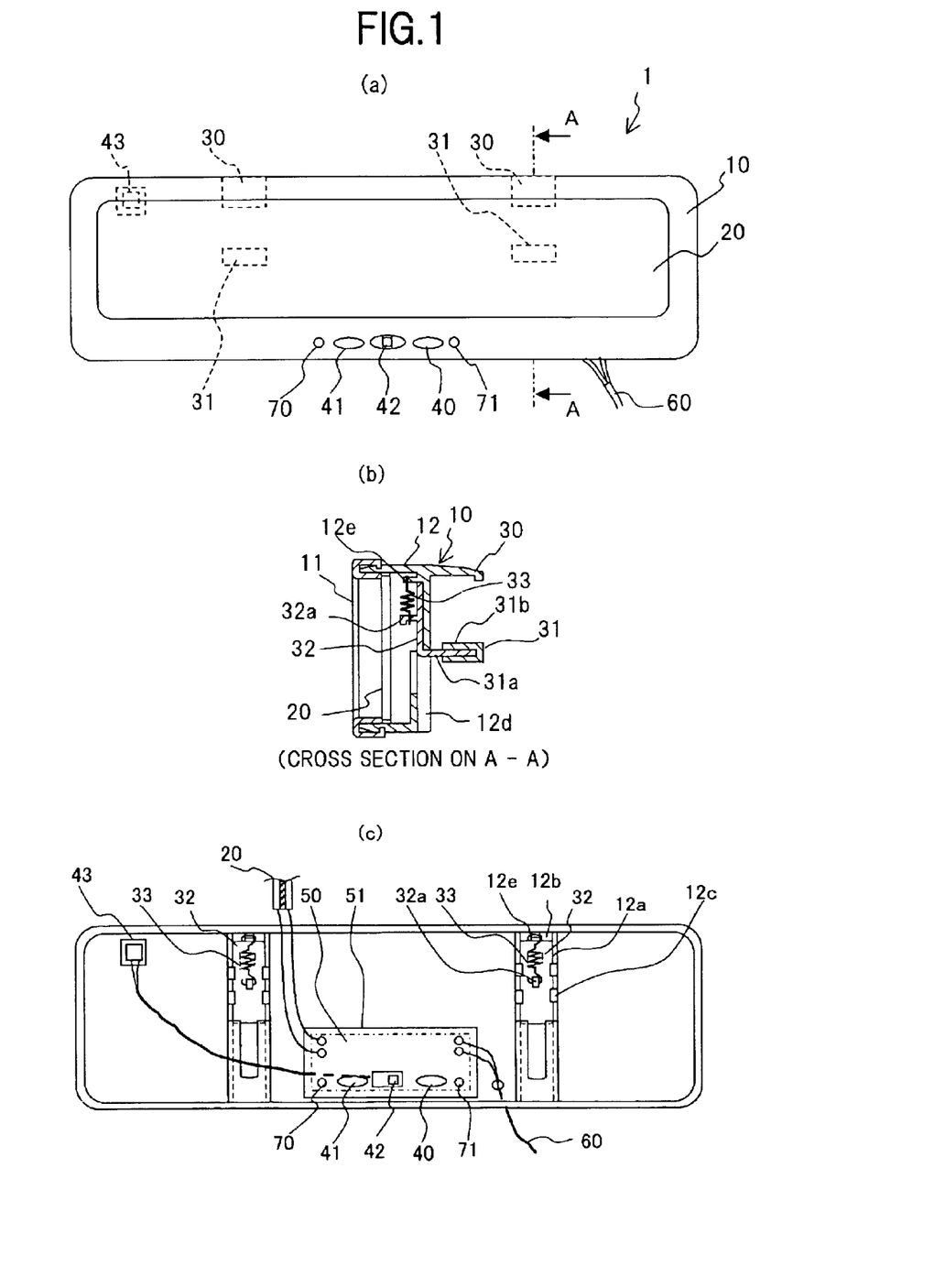
FIG. 1 shows an antiglare mirror apparatus in a vehicle compartment of an embodiment according to the invention, wherein (a) is a front view thereof, (b) is a vertical section side view taken in the direction of the arrow on line A-A of (a), and (c) is a front view showing an inside of a holder body.

A mounted-antiglare mirror apparatus 1 of a first embodiment according to the invention as shown in FIG. 1 comprises a housing or holder 10 made of synthetic resins or metals, a mirror member 20, mounting members (30,31) that fix the holder 10 to a front mirror (pre-mounted mirror) disposed beforehand to a vehicle, signal generators (41,42, 43), a control circuit 50, and a power source member 60.

The holder 10 comprises a surface frame member 11 and a body portion 12 forming a box with a periphery of the body portion 12 being engaged in the surface frame member 11. The mirror member 20 is engaged to an outer periphery of the body portion 12. The surface frame member 11 fixes the mirror member 20 on the periphery of the body portion 12 when the body portion 12 and its periphery are engaged for assembly. The entire holder 10 is mounted to the pre-mounted mirror through the mounting members 30,31 extending from the rear of the body portion 12 toward a front side of the vehicle.

The control circuit 50, which is known in the art, is arranged on a base 51 which is fixed to a central portion of an inner side of the body portion 12 of the holder 10. The signal generators (manual switch 41, specific light sensor 42, and surrounding light sensor 43) are electrically connected to the control circuit 50. The manual switch 41, the specific light sensor 42 and a switch 40 are exposed from a window portion opened on the surface frame member 11 of the holder 10 toward a rear side in the vehicle moving direction. The surrounding light sensor 43 is exposed from a window portion opened on an upper end of the rear of the body portion 12 toward the front side in the vehicle moving direction. The driving electric signals are supplied to the control circuit 50 from these signal generators. The control circuit 50 determines a coloring state of the mirror member 20 based upon these signals, the drive-electric energy is obtained from the power source member 60 corresponding to the coloring state, and the drive-electric energy obtained is supplied to the mirror member 20 (as disclosed in Japanese Unexamined patent Publication No. 9-24768).

Two mounting members are projected in the vehicle moving direction at the left-right symmetrical positions away by a predetermined distance from the central portion of the holder 10. Each mounting member comprises two engagement members 30 (stationary), 31 (movable) being disposed, respectively, in the upper side and in the lower side spaced from each other.

The stationary engagement portion 30, as shown in FIG. 1(b), is integrally formed as projected from the upper end of the back side of the body portion 12 toward the direction of the vehicle front when mounted.

The movable engagement portion 31 is slidably arranged under the stationary engagement portion 30 in the upper-lower direction of the body portion 12. In detail, the movable engagement portion 31 is metallic and comprises a slide piece 32 guided by a restraining plate 12c in a longitudinal groove 12b formed in an inner surface of the body portion 12 by a longitudinal rib 12a and a projector 31a, a lower end of which is L-shaped and projected toward the vehicle front through a longitudinal opening 12d formed in the body portion 12. An engagement piece 31b made of synthetic resin is engaged and fixed to the projector 31a.

An engagement nail 32a projected into an inside of the holder is formed at the central portion of the slide piece 32. A hook portion at a lower end of a tension coil spring 33 is engaged to the engagement nail 32a.

A hook portion at an upper end of the tension coil spring 33 is engaged to an engagement nail 12e formed at an upper portion of the longitudinal groove portion 12b.

A structure where the mounting members 30,31 hold the pre-mounted front mirror to a vehicle will be explained in reference to FIGS. 2–5 which show the members necessary for holding function of the mounting members in the inner surface of the holder body 12.

Figure 2:
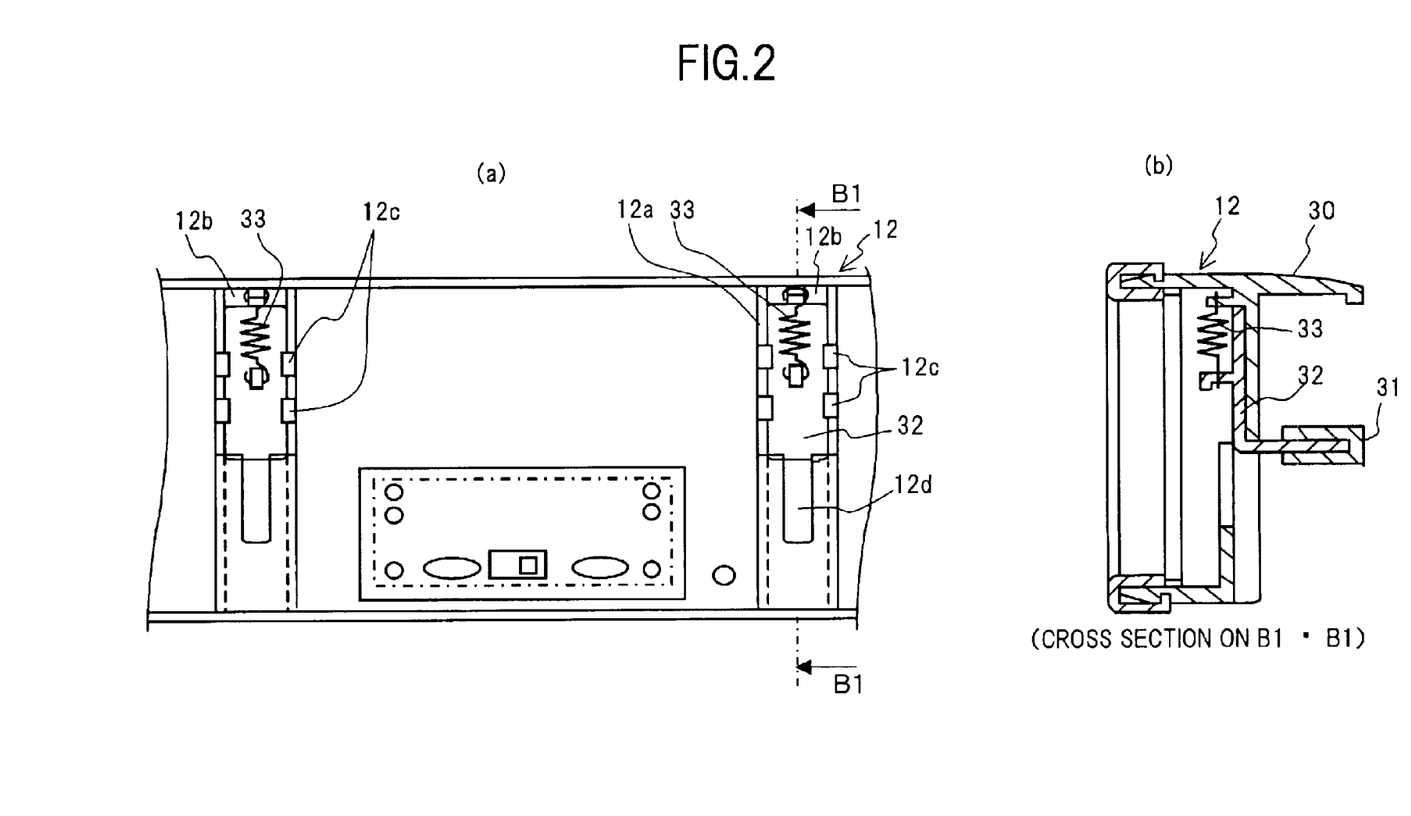
FIG. 2 shows a state prior to mounting the antiglare mirror apparatus, wherein (a) is a partial front view of the holder body, and (b) is a section view taken in the direction of the arrow on line B1—B1 of (a).

Prior to mounting, as shown in FIGS. 2(a), (b), the movable engagement portion 31 is forced upward by initial tension of the tension coil spring 33 toward the stationary engagement portion 30.

Figure 3:
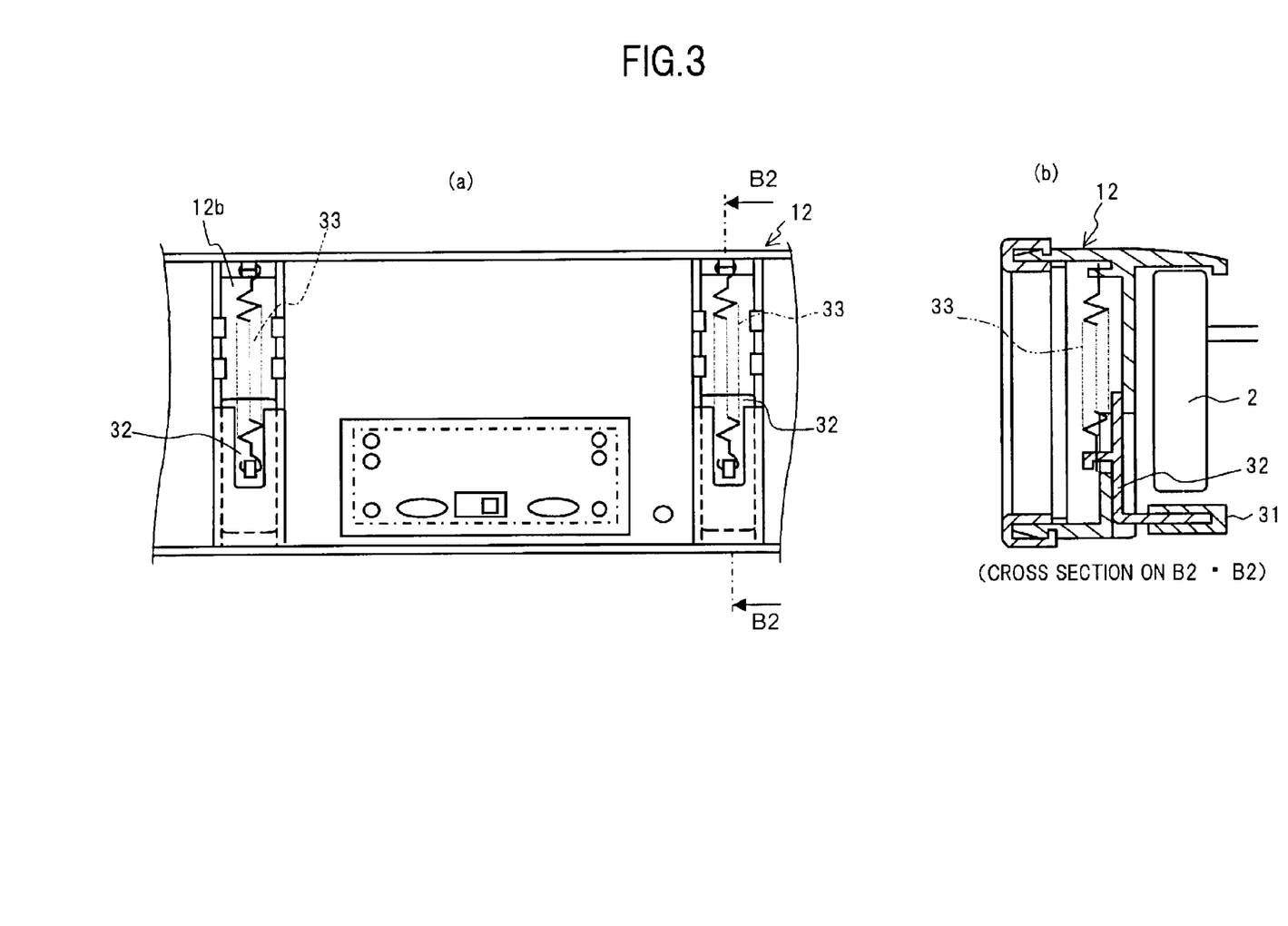
FIG. 3 shows mounting the antiglare mirror apparatus to a pre-mounted mirror by a mounting member, wherein (a) is a partial front view of the holder body and (b) is a section view in the direction of the arrow on line B2—B2 of (a).

When mounted as shown in FIGS. 3(a), (b), the slide piece 32 is moved in the downward direction sliding in the longitudinal groove portion 12a as a result of depressing the movable engagement portion 31 against the tension of the tension coil spring 33. When the movable engagement portion 31 is being depressed, the pre-mounted mirror is inserted between the stationary engagement portion 30 and the movable engagement portion 31 from the upper and lower sides thereof.

Figure 4:
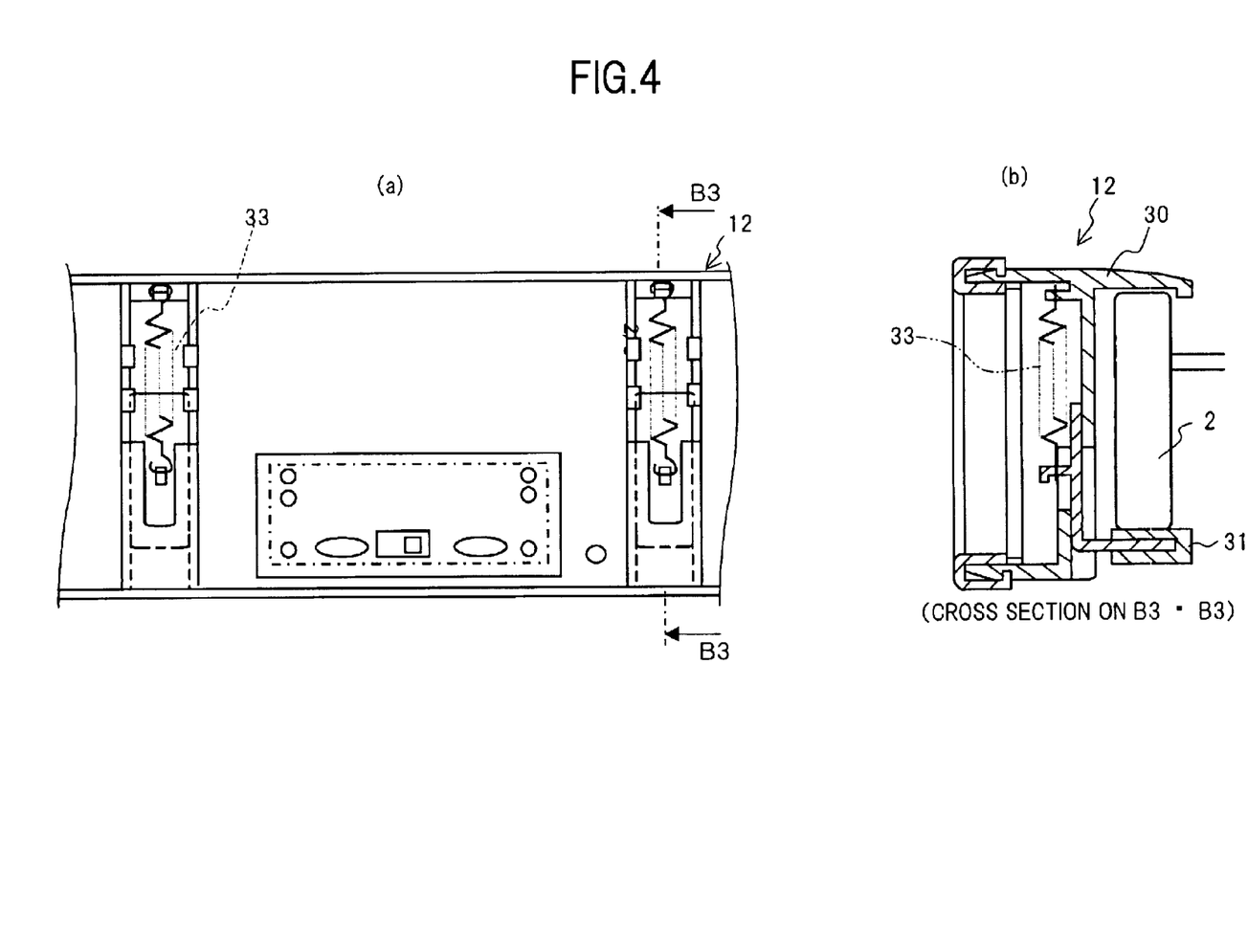
FIG. 4 shows the antiglare mirror apparatus mounted to the pre-mounted mirror, wherein (a) is a partial front view of the holder body and (b) is a section view taken in the direction of the arrow on line B3—B3 of (a).
Figure 5:
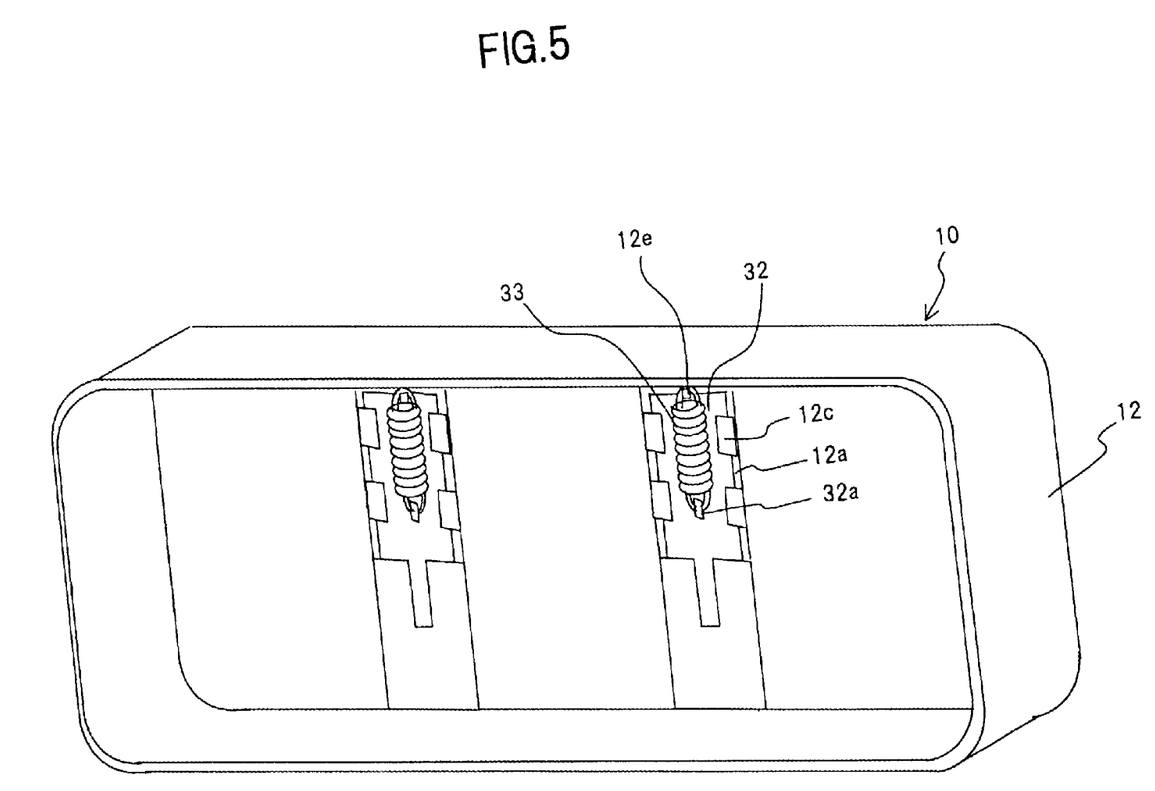
FIG. 5 is a perspective view showing the interior of the holder body.

Thereafter, when the movable engagement portion 31 is released, as shown in FIGS. 4(a), (b), the slide piece 32 moves in the upper direction due to returning force of the tension coil spring 33, thereby to move the movable engagement portion 31 upward and to elastically hold the pre-mounted mirror 2.

Next, the mirror member 20 will be explained with reference to FIG. 6. The mirror member 20 is an electrochromic element made by laminating a light transmission electrode material 21, the antiglare material 22 including an electrochromic layer, and a light reflective electrode material 23 in order from the rear surface in the vehicle moving direction. The electrochromic element is driven (oxidization and reduction reaction) by supply of electric energy (voltage impression) with the electrochromic element being colored or non-colored (achromatized) by its drive.

Figure 6:
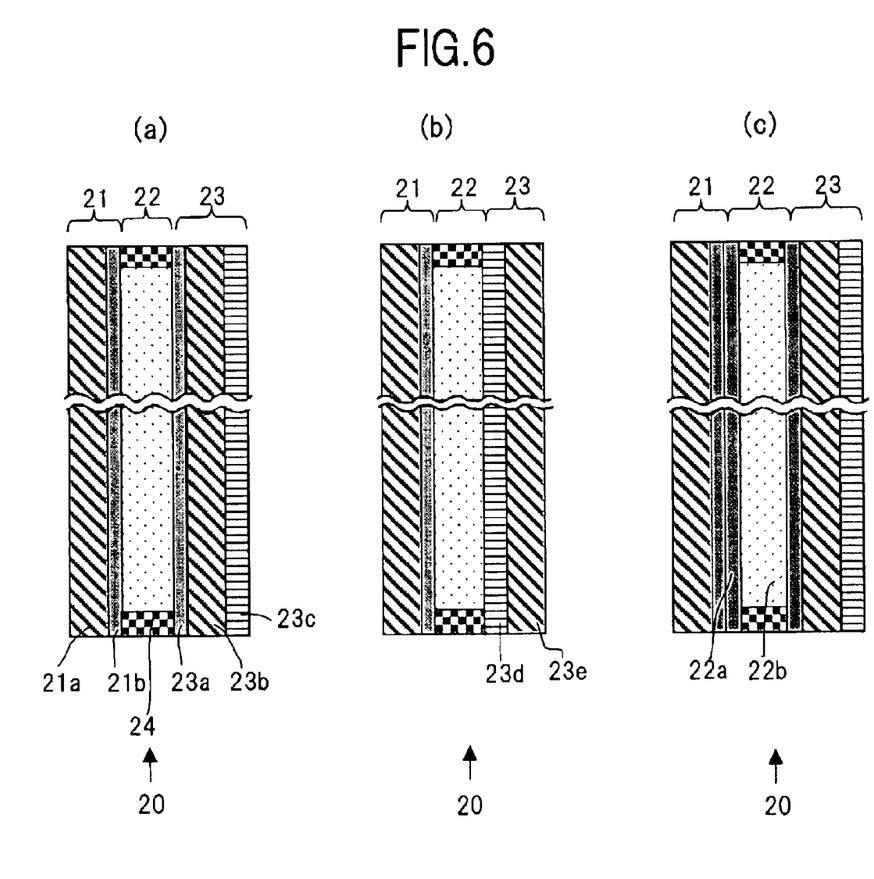
FIG. 6 shows a section of a mirror member of the antiglare mirror apparatus, wherein (a) is a section view of the embodiment, and (b) and (c) are variations of the embodiment.

In the embodiment shown in FIG. 6(a), the light transmission electrode material 21 is formed by laminating the transparent base 21a and the transparent conductive film 21b and the antiglare material 22 is formed of a transmission electrolyte film including an electrochromic compound and the light reflective electrode material 23 is formed by laminating a transparent conductive film 23a, a transparent base 23b, and a reflective film 23c in order from the surface side. The mirror member 20 is formed by connecting these materials by a sealing member 24.

The light transmission electrode material 21 may be any material so long as it is a transmission conductive material having an electrode, and may be formed of a unitary material.

Non-colored glasses or colored glasses, reinforced glasses, light transmission resins and the like can be used for the transparent base 21a of the light transmission electrode material 21. Polyethylene terephthalate, polyethylene naphthalate, polyamide, polysulfone, polyethersulfone, polyether ketone, polyphenylene sulfide, polycarbonate, polyimide, polymethyl methacrylate, polystyrene, and the like can be used as the light transmission resin. The transmission base preferably has a certain degree of rigidity and has no limitations on its thickness, but is preferably thinner in view of light weight, normally 3 mm or less, preferably 2 mm or less than it, further preferably 1.3 mm or less.

As the transparent conductive film 21b of the light transmission electrode material 21, for example, metallic thin films such as gold, silver, chrome, copper, and tungsten or metallic oxide such as ITO ($In_2 O_3$—$SnO_2$), tin oxide, silver oxide, zinc oxide, and vanadium oxide can be used. The transparent conductive film has no limitations in film thickness as long as it has a light transmission property, normally 10–1000 nm thick, preferably in the range of 50–300 nm and no limitations in surface resistance (resistance rate), normally 1–100Ω/sq, preferably in the range of 3–30Ω/sq.

The light reflective electrode material 23 can be any material as long as it has a conductive material forming an electrode end also can reflect light that transmits the light transmission electrode material 21 and the antiglare material 22. In a first embodiment of the light reflective electrode material 23, the transparent conductive film 23a, the transparent base 23b, and the reflective film 23c are laminated in order from the surface side. In a second embodiment, as shown in FIG. 6(b), wherein the light reflective conductive film 23d and a non-conductive base 23e are laminated in order from the surface side. In a third embodiment, the transparent conductive film, the reflective film and the non-conductive base are laminated in order from the surface side. In a fourth embodiment, the transparent conductive film and the light reflective base are laminated in order from the surface side, and in a fifth embodiment, a plate material having both light reflectivity and conductivity is used.

The plate material of the fifth embodiment can be any material as long as it functions as a mirror and has a stable function in electrochemistry as an electrode and for example, metallic films such as gold, platinum, tungsten, tantalum, rhenium, osmium, iridium, silver, nickel, palladium, and chrome or alloy films such as platinum-palladium, platinum-rhodium, silver-palladium, stainless, and the like can be used.

Glasses, as well as plastics, wood materials, stone materials and the like can be used, whether transparent or opaque, as a non-conductive base of the second and third embodiments.

The reflective film and the light reflective base, respectively, mean a thin film and a base functioning as a mirror, for example thin films and plate bodies including silver, chrome, aluminum, stainless, nickel-chrome. The base has some degree of rigidity and can be omitted when the light reflective material or the conductive material has some rigidity.

The antiglare material 22 is formed from an electrochromic element including an electrochromic layer that is an ion conductive layer which transmits light and may be a single layer(namely, an electrochromic compound mixed with an electrolytic layer which is light transmissive) or as shown in FIG. 6(c), may be an electrochromic thin film 22a laminating an electrolytic layer 22c (namely, having the electrolytic layer which transmits light and the electrochromic compound layer) or a combination thereof.

The ion conductive layer normally has $1 \times 10^{-7}$ S/cm or more at a room temperature, preferably $1 \times 10^{-6}$ S/cm or more, further preferably $1 \times 10^{-5}$ S/cm or more as ion conductivity and in layer thickness, normally has 1 μm or more, preferably in the range of from 10 μm to 3 mm, preferably 1 mm or less than 1 mm.

The electrochromic compound generates a reversible oxidation-reduction reaction due to voltage impression and repeats the coloring function and non-coloring (achromatic) function due to the oxidation-reduction reaction. The compound comprises an anode-electrochromic compound, a cathode-electrochromic compound, or an electrochromic compound having both an anode-electrochromic compound structure and a cathode-electrochromic compound structure.

The anode-electrochromic compound has an absorption spectrum that increases by electrochemical oxidation-reduction reaction and comprises a pyrazoline compound derivative, a metallocene compound derivative, a phenylenediamine compound derivative, a phenazine compound derivative, a phenoxysazine compound derivative, a phenothiazine compound derivative, a tetrathiafulvalene compound derivative.

The cathode-electrochromic compound has a property that absorption spectrum increases due to electrochemical oxidation-reduction reaction and comprises a styryl compound derivative, a viologen compound derivative, or anthraquinone compound derivative.

The anode-electrochromic structure comprises a pyrazoline compound derivative, a metharocene compound derivative structure, a phenyrenediamine compound derivative structure, a benzine compound derivative structure, a phenazine compound derivative structure, a phenoxysazine compound derivative structure, a phenothiazine compound derivative structure, or a tetrathiafulvalene derivative structure and the cathode electrochromic compound comprises a viologen compound derivative structure or an anthraquinone compound derivative structure.

An organic compound including both anode and cathode electrochromic structures is preferable wherein there are not more than two anode structures and not more than two cathode structures per one molecule. Namely the preferable organic compound is chosen as one or more from a case where one anode structure and one cathode structure per one molecule exist, a case where one anode structure and two cathode structures per one molecule exist, a case where two anode structures and one cathode structure per one molecule exist, and a case where two anode structures and two cathode structures per one molecule exist.

The antiglare material 22 is preferably manufactured by mixing the electrochromic compound into an ion conductive substance of any fluid, gel or solid and use of a solid ion conductive substance is especially preferable in view of practicability, compactness, and light weight.

In case of manufacturing the antiglare material by mixing the electrochromic element into the ion conductive substance of the fluid type, the electrochromic element is dissolved using a support electrolyte such as salts, acids, and alkalis as a solvent. However, when the electrochromic activator has ionicity, the support electrolyte is not needed and solvents in general used in an electrochemical cell and a battery can be used. As the support electrolyte, salts, acids, and alkalis normally used in the field of an electrochemistry and a battery can be used. Since the salts used as the support electrolyte have no limitations, inorganic ion salts such as alkali metal acids and alkali-earth metals, 4-class ammonia salts, and circular-4-class ammonia salts can be used.

A gel-fluid-type ion conductive substance is made by increasing viscosity of the fluid-type ion conductive substance and gelling it, and is prepared by combining polymers or gelling agents to the fluid-type ion conductive substance.

A solid ion conductive substance is a substance that is a solid at a normal temperature and has ion conductivity, and includes polyethylene oxide, polymer of oxyethylene methacrylate, naphyon, polystyrene sulfonic acid, $Li_3N$, $Na\text{-}\beta\text{-}Al_2O_3$, or $Sn(HPO_4)_2 \square EH_2O$. A polyelectrolyte made by dispersing a support electrolyte to a highly polymerized compound obtained by polymerizing an oxyalkylene methacrylate compound, an oxyalkylene acrylate compound, or an urethane acrylate compound can be used.

As described above, the mirror member 20 comprises the light transmission electrode material 21, the antiglare material 22 and the light reflective electrode material 23 and may be flat, and may have a primary, quadric, or cubic surface, and further may be transformed due to stress.

The signal generators (41,42,43) and the control circuit 50 will be explained with reference to FIG. 1 and FIG. 7.

The signal generator generates an electric signal to drive the mirror member 20 as the electrochromic element and comprises the manual switch 41 used for manually controlling the coloring of the mirror member 20 and the specific light sensor 42 and the surrounding light sensor 43 for automatically controlling the coloring thereof. A choice between the manual control and the automatic control of the coloring is made by a switch 40.

When manual operation is chosen by the switch 40, a driving electric signal (on or off) is generated by operating the manual switch 41 that transforms coloring and non-coloring. On this occasion, a coloring state (coloring or non-coloring) is displayed on an indicator 70.

The specific light sensor 42 detects a light amount from a specific direction (for example, the rear of the vehicle) and is directed toward an incident angle of light such as a downward center of the holder surface frame member 11. The surrounding light sensor 43 detects brightness around the mirror and is positioned at a location where it can sense the brightness of a vehicle-running environment such as a back side of the holder. The specific light sensor 42 and the surrounding light sensor 43 are operated as the automatic operation is chosen by the switch 40, detect a received light amount by a photoelectric conversion element, and generate electric signals as light amount information at predetermined times.

The control circuit 50 is a known electronic circuit that includes an input terminal from the power source member 60 and the signal generators 41, 42, 43, and an output terminal to the mirror member 20 and is located inside the holder 10. The control circuit 50 is located in the back side (between the holder body portion 12 mounted in an upper surface of the pre-mounted inner mirror 2 and the light reflective electrode member 23) of the light reflective electrode member 23 of the mirror member 20 so that the mirror member 20 functions as a mirror by itself.

The power source member 60 includes a wire connected to a socket of a cigarette lighter and the wire extends outside of the holder 10 through a bore formed in the back side of the holder 12.

Figure 7:
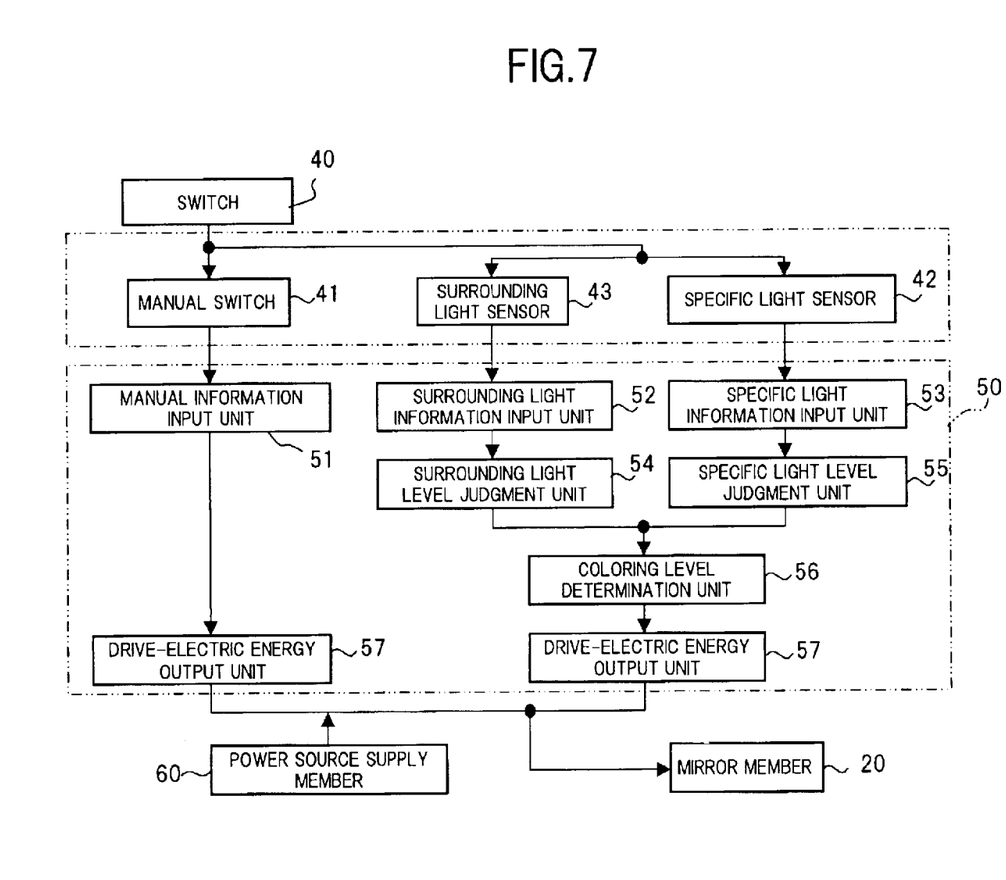
FIG. 7 is a block diagram showing the control method of coloring and non-coloring (achromatizing) the antiglare mirror apparatus.

As shown in FIG. 7, the control circuit 50 includes a manual information input unit 51, a surrounding light information input unit 52, a specific light information input unit 53, a surrounding light level judgment unit 54, a specific light level judgment unit 55, a coloring level determination unit 56, and a drive-electric energy output unit 57. The control circuit 50 determines coloring level in a vehicle running state based upon signals input from the signal generators 41, 42, 43 in real time and supplies from the power source member 60 to the mirror member 20 the energy corresponding to the coloring level.

When manual operation is chosen by the switch 40, the manual information input unit 51 receives an input of manual information (namely, on-or off-signal) from the manual switch 41 and supplies the manual information to the drive-electric energy output unit 57. When the on-signal is input, the drive-electric energy in the direction of coloring is supplied from the power source member 60 to the mirror member 20, and when the off-signal is input, the drive-electric energy in the direction of non-coloring is supplied.

The surrounding light information input unit 52 outputs the light amount information of the surrounding light sensor 43 to the surrounding light level judgment unit 54. The surrounding light level judgment unit 54 judges coloring level $A_i$ ($i=1, 2 \ldots n$) by comparing the light amount information with a predetermined light amount threshold value. The coloring level $A_i$ is set as a plurality of steps and as a larger value as the light amount is large.

On the other hand, the specific light information input unit 53 outputs the light amount information of the specific light sensor 42 to the specific light level judgment unit 55. The specific light level judgment unit 55 judges coloring level $B_j$ ($i=1, 2 \ldots n$) by calculating a variation amount based upon the light amount information and by comparing the calculated variation amount with a predetermined variation amount threshold value. In this case, increase of the light amount is indicated as plus (the direction of coloring) and decrease of the light amount is indicated as minus (the direction of non-coloring). Namely an absolute value of the light amount gets large as the variation amount becomes larger.

The coloring level determination unit 56 determines a coloring level C by performing a certain calculation to the coloring level $A_i$ of the surrounding light and the coloring level $B_j$ of the specific light. This calculation is thought to be, for example, $C = A_i \times h + B_j \times (1-h)$ where "h" indicates a ratio of how much the surrounding light affects the variation of the light amount from the specific direction and is set in the range of 0–1. When $h=0$, a coloring amount is determined based only upon the light amount information from the specific light sensor and when $h=1$, the coloring amount is determined based only upon the light amount information from the surrounding light sensor. This calculation is made taking into account that sensing how glaring it is depends on a vehicle running state, as seen from the event that a specific light is glaring at a dark place. An optimal coloring level is determined by adjusting a value of h corresponding to the vehicle running environment and accordingly the mirror member 20 is colored corresponding to the vehicle running environment. On this occasion, a coloring indication identifying the coloring level of the mirror member 20 is shown in the indicator 71.

The drive-electric energy output unit 57 determines a state of supply of the drive-electric energy (namely, how much energy is supplied in which direction, coloring or non-coloring) and power corresponding to the supply determination is supplied from the power source member 60 to the mirror member 20.

An application state of the antiglare mirror apparatus 1 mounted in a vehicle compartment having the above construction will be explained.

The holder 10 is mounted to the pre-mounted front mirror 2 for a vehicle by the mounting members 30,31 and the wire as the power source member 60 extending from the holder 10 is connected to the in-vehicle power source such as the socket of the cigarette lighter.

During movement of the vehicle, first a manual operation or an automatic operation is chosen by the switch 40.

When the manual operation is chosen, the mirror member 20 is colored or non-colored by the manual switch 41.

When the automatic operation is chosen, the mirror member 20 is automatically colored or non-colored based upon the light amount information detected by the surrounding light sensor 43 and the specific light sensor 42. Since the coloring is made to the mirror member 20 based upon the vehicle running state by the surrounding light sensor 43, the mirror member can function as a sunglass by coloring the mirror member during daytime with a large amount of surrounding light and visibility thereof improves by non-coloring the mirror member at a dark place such as a tunnel.

While the non-coloring state is kept at a dark place, when a light amount from a specific direction increases (when a headlight of a vehicle behind is approaching), the reflectivity is reduced by coloring the mirror member, thereby to prevent glare.

In this embodiment, the manual coloring and the automatic coloring is selectively made, but coloring and non-coloring may be made only by the manual switch 41 and the coloring amount may be determined based upon information from the manual switch 41 and the specific light sensor 42 and the coloring amount may be determined based upon the surrounding light information at a plurality of places. A plurality of coloring levels may be selected by the manual switch 41 wherein the mounting positions of the switch and the sensor are not limited to the embodiment.

Figure 8:
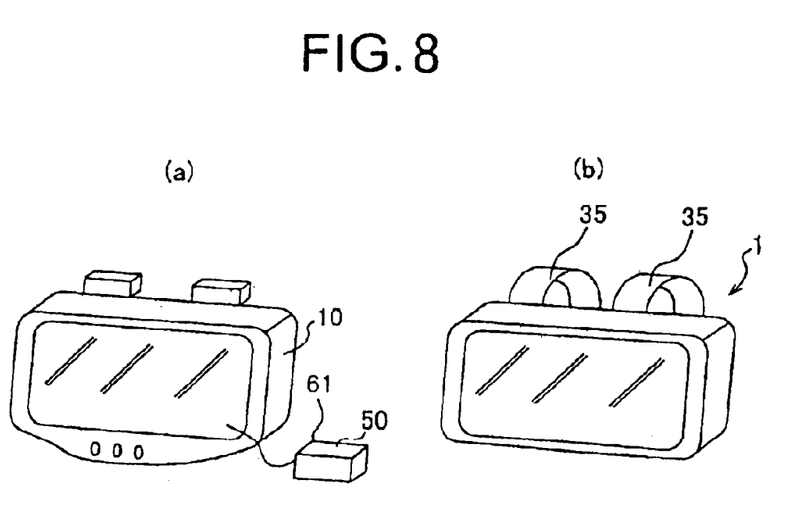
FIG. 8 is a perspective view showing a variation of the antiglare mirror apparatus.

As shown in FIG. 8(a), the control circuit 50 may be disposed outside the holder 10. Namely, a casing 61 receiving the control circuit 50 may be disposed near a sun visor or at a location of the socket of the cigarette lighter. Thereby a thinly-and lightly-made holder 10 is possible, providing more variations of mirror shape and practical and design advantages can be obtained.

The power source member 60 in the embodiment receives power from the socket of cigarette lighter, but, not to be limited thereto, may receive power from a battery independently from a car battery or a solar battery.

A mounting location of the antiglare mirror apparatus 1 according to the invention may be any place inside a vehicle compartment, for example, near a hand of a driver to view passengers in the rear seat.

The shape of the antiglare mirror apparatus 1 according to the invention may be any shape and a mounting member thereof may be a rubber band 35 as shown in FIG. 8(b), a suction cup, a clipper, and an adhesive tape.

The antiglare mirror apparatus is useful when a high-antiglare mirror is detachably mounted inside a vehicle compartment.

What is claimed is:

1. An antiglare mirror apparatus in a vehicle compartment comprising:
    (a) a mirror member that is an electrochromic element comprising:
        (1) an antiglare material comprising an electrochromic layer,
        (2) a light transmission electrode material, and
        (3) a light reflective electrode material, wherein said light transmission electrode material is disposed on one side of said antiglare material and said light reflective electrode material is disposed on the other side of said antiglare material;
    (b) a power source member that supplies a drive-electric energy to said electrochromic element;
    (c) a signal generator that generates a driving electric signal to color and uncolor said electrochromic element, said signal generator comprising:
        (1) a surrounding light sensor that detects a light amount around a vehicle; and
        (2) a specific light sensor that detects a light amount of light from a specific direction;
    (d) a control circuit that controls said drive-electric energy to said electrochromic element based upon said driving electric signal, said control circuit comprising:
        (1) a surrounding light information input unit that receives information regarding a light amount of a surrounding light from said surrounding light sensor;
        (2) a specific light information input unit that receives information regarding a variation amount of a light amount detected for every predetermined time by said specific light sensor;
        (3) a surrounding light level judgment unit that determines a first coloring level Ai as numerical information by comparing the information input into said surrounding light information input unit with a predetermined light amount threshold value;
        (4) a specific light level judgment unit that determines a second coloring level Bi as numerical information by comparing the information input into said specific light information input unit with a predetermined light amount threshold value;
        (5) a coloring level determination unit that determines a third coloring level C by performing a certain calculation to the first coloring level Ai and the second coloring level Bi executed according to the equation $C = Ai \times h + Bj \times (1-h)$ where "h" is the ratio of how much the surrounding light affects the amount of light from the specific direction and has a value between 0–1; and
        (6) a drive-energy output unit that determines the supply state of said drive-electric energy corresponding to the third coloring level C determined by said coloring level determination unit; and
    (e) a holder that holds the mirror member, said holder being detachably mounted within a vehicle compartment.

2. An antiglare mirror apparatus according to claim 1, wherein said holder is mounted within the vehicle compartment so that said mirror member covers a pre-mounted inner mirror.

3. An antiglare mirror apparatus according to claim 2, wherein said holder comprises a clip member that holds the inner mirror with an upper edge portion and a lower edge portion of the inner mirror being placed into said clip member, said clip member mounting said holder within the vehicle compartment.

4. An antiglare mirror apparatus according to claim 2, wherein said holder comprises a rubber band, wherein said rubber band is wound around the inner mirror.

5. An antiglare mirror apparatus according to claim 2, wherein said control circuit is disposed inside said holder between said light reflective electrode material and said inner mirror.

6. An antiglare mirror apparatus according to claim 1, wherein said control circuit is disposed outside of said holder.

7. An antiglare mirror apparatus according to claim 1, wherein said antiglare material is constituted by mixing an electrochromic compound into a light transmission electrolyte.

8. An antiglare mirror apparatus according to claim 1, wherein said antiglare material comprises a light transmission electrolyte layer and an electrochromic compound layer.

9. An antiglare mirror apparatus according to claim 1, wherein said power source member comprises a wire that is connected to a socket of a cigarette lighter of a vehicle.

10. An antiglare mirror apparatus according to claim 1, wherein said signal generator is a manual switch that generates a signal of coloring or non-coloring and said control circuit transforms the supply state of said drive-electric energy to the direction of coloring or non-coloring based upon said driving electric signal generated from said manual switch.

11. An antiglare mirror apparatus according to claim 10, wherein said manual switch chooses a plurality of coloring levels and said control circuit controls a supply amount of said drive-electric energy based upon said driving electric signal regarding the coloring levels generated from said manual switch.

12. An antiglare mirror apparatus according to claim 1, further comprising an indicator that indicates a driving state of said electrochromic element.

13. An antiglare mirror apparatus in a vehicle compartment comprising:
   (a) a mirror member that is an electrochromic element comprising:
      (1) an antiglare material comprising an electrochromic layer,
      (2) a light transmission electrode material, and
      (3) a light reflective electrode material, wherein said light transmission electrode material is disposed on one side of said antiglare material and said light reflective electrode material is disposed on the other side of said antiglare material;
   (b) a power source supply means that supplies a drive-electric energy to said electrochromic element;
   (c) a signal generation means for generating a driving electric signal to color and uncolor said electrochromic element, said signal generation means comprising:
      (1) a surrounding light sensor that detects a light amount around a vehicle; and
      (2) a specific light sensor that detects a light amount of light from a specific direction
   (d) control circuit means for controlling said drive-electric energy to said electrochromic element based upon said driving electric signal, said control circuit means comprising:
      (1) a surrounding light information input unit that receives information regarding a light amount of a surrounding light from said surrounding light sensor;
      (2) a specific light information input unit that receives information regarding a variation amount of a light amount detected for every predetermined time by said specific light sensor;
      (3) a surrounding light level judgment unit that determines a first coloring level Ai as numerical information by comparing the information input into said surrounding light information input unit with a predetermined light amount threshold value;
      (4) a specific light level judgment unit that determines a second coloring level Bi as numerical information by comparing the information input into said specific light information input unit with a predetermined light amount threshold value;
      (5) a coloring level determination unit that determines a third coloring level C by performing a certain calculation to the first coloring level Ai and the second coloring level Bi executed according to the equation $$C = Ai \times h + Bj \times (1-h)$$

where "h" is the ratio of how much the surrounding light affects the amount of light from the specific direction and has a value between 0–1; and
      (6) a drive-energy output unit that determines the supply state of said drive-electric energy corresponding to the third coloring level C determined by said coloring level determination unit; and
   (e) a holder that holds the mirror member, said holder being detachably mounted within a vehicle compartment.

* * * * *

UNITED STATES PATENT AND TRADEMARK OFFICE
CERTIFICATE OF CORRECTION

PATENT NO. : 6,814,451 B2  Page 1 of 1
APPLICATION NO. : 10/634016
DATED : November 9, 2004
INVENTOR(S) : Yoshinori Nishikitani et al.

It is certified that error appears in the above-identified patent and that said Letters Patent is hereby corrected as shown below:

On the title page, item [73]: should read.

Assignee: Nippon Oil Corporation, Tokyo (JP);
              Kabushiki Kaisha Honda Lock, Miyazaki (JP)

Signed and Sealed this

Second Day of February, 2010

David J. Kappos
*Director of the United States Patent and Trademark Office*